(12) United States Patent
Yamin, Sr. et al.

(10) Patent No.: US 11,161,481 B2
(45) Date of Patent: Nov. 2, 2021

(54) PLASTIC CLIP CORE AND ROTARY BRUSH

(71) Applicant: GALLOP BRUSH, LLC, Imlay City, MI (US)

(72) Inventors: Theodore Yamin, Sr., Metamora, MI (US); Anthony Robert Spearing, Metamora, MI (US)

(73) Assignee: Gallop Brush, LLC, Imlay City, MI (US)

( * ) Notice: Subject to any disclaimer, the term of this patent is extended or adjusted under 35 U.S.C. 154(b) by 21 days.

(21) Appl. No.: 16/711,863

(22) Filed: Dec. 12, 2019

(65) Prior Publication Data

US 2021/0179034 A1 Jun. 17, 2021

(51) Int. Cl.
| | |
|---|---|
| A46B 13/00 | (2006.01) |
| B60S 3/06 | (2006.01) |
| A46B 9/00 | (2006.01) |
| A46B 13/02 | (2006.01) |
| A46B 3/00 | (2006.01) |

(52) U.S. Cl.
CPC .................. B60S 3/06 (2013.01); A46B 3/00 (2013.01); A46B 9/005 (2013.01); A46B 13/005 (2013.01); A46B 13/02 (2013.01); A46B 2200/3046 (2013.01)

(58) Field of Classification Search
CPC ............ B60S 3/06; B60S 3/063; B60S 3/066; A46B 9/005; A46B 13/005; A46B 2200/3046; A47F 5/02; A47F 5/025
See application file for complete search history.

(56) References Cited

U.S. PATENT DOCUMENTS

| | | | | | |
|---|---|---|---|---|---|
| 3,862,463 | A | * | 1/1975 | Reiter ...................... | A46B 3/14 15/182 |
| 5,400,458 | A | * | 3/1995 | Rambosek ........... | A46B 13/005 15/179 |
| 2002/0174503 | A1 | * | 11/2002 | Clark ................... | A46B 13/005 15/230.16 |
| 2013/0104332 | A1 | * | 5/2013 | Belanger .............. | A46B 13/001 15/246 |
| 2014/0331420 | A1 | * | 11/2014 | Yamin .................. | A46B 13/005 15/53.3 |

* cited by examiner

*Primary Examiner* — Randall E Chin
(74) *Attorney, Agent, or Firm* — Heedlaw Group PLLC; Thomas P. Heed

(57) ABSTRACT

A plastic clip core is disclosed for use in a rotary brush in a carwash. The plastic clip core is used in conjunction with a rotational hub, a plurality of plastic clips, and an equal plurality of longitudinal washing elements ("LWE"). The plastic clip core has a plurality of semi-cylindrical void cavities, each with an adjoining cylindrical void cavity. Each plastic clip has two parallel members, a first member and a second member. Each LWE has an upper edge, lower edge, free edge, and a cylindrical mount. A first member of a plastic clip fits into the cylindrical mount of the LWE and the semi-cylindrical void cavity. The second member of the plastic clip fits into the cylindrical void cavity, thus securing the LWE to the plastic clip core. The plastic clip core mates with the rotational hub in a no-slip condition.

6 Claims, 10 Drawing Sheets

PLASTIC CLIP CORE AND ROTARY BRUSH

FIELD OF INVENTION

The present invention relates to the classification for Servicing, Cleaning, Repairing, Supporting, Lifting, or Maneuvering of Vehicles Not Otherwise Provided for; and to one or more sub-classifications for Vehicle cleaning apparatus not integral with vehicles, for exteriors of land vehicles, with rotary bodies contacting the vehicles. Specifically, the present invention is plastic clip core that allows for rapid maintenance of the rotary brushes that form a core part of a carwash.

BACKGROUND OF INVENTION

Modern carwashes deploy a plurality of rotary brushes to remove dirt and debris from the exterior of motor vehicles. Rotary brushes typically are comprised of a plurality of longitudinal washing elements ("LWE") that are secured to a rotational hub. The LWEs can be secured to the rotational hub at one end, leaving one end free. Alternately, the LWE can be secured to the rotational hub near the mid-point of the LWE, leaving two free ends. The LWEs are fabricated from a flexible hygroscopic material, such as felt, foamed polymers, polyethylene, foamed ethylene vinyl acetate ("EVA"), or fabric. The LWEs are so spaced about the rotational hub as to allow the rotary brush to rotate rapidly in a balanced fashion.

When the rotary brush is inactive, the LWEs hang slack. When the rotary brush rotates at speed, the LWEs extend nearly horizontally away from the rotational hub, due to centrifugal force. The free ends of the plurality of LWEs contact the motor vehicle being washed. The contact of the LWEs removes dirt and debris from the exterior of the motor vehicle. The wash environment is wet, with water and detergent being added either directly to the rotary brush or to the vehicle, or both. The contact of the LWE, in conjunction with water and detergent, cleans the car.

The repetitive contact of the free ends of the LWEs degrades the integrity of the material from which it is fabricated. The LWEs often tear. When a rotary brush loses part of one or more LWEs, it rotates out of balance. Although a rotary brush assembly is designed to handle out-of-balance rotary brushes, the long-term effect is negative. Proper maintenance requires the replacement of the LWEs at pre-defined intervals. Damage, such as tears, to the LWEs also requires maintenance.

The maintenance of rotary brush assemblies can be time-consuming and costly. If maintenance is required during operational hours for the car wash, it results in down-time during which employees are being paid, but no vehicles are being washed. If maintenance is performed during non-operational hours, staff must either be present before or after operational hours to perform the maintenance.

Most rotary brush assemblies are cumbersome with respect to replacing or re-positioning the LWEs. What the market needs is a rotary brush assembly that allows for the quick replacement or re-positioning of the LWEs.

SUMMARY OF THE INVENTION

This summary is intended to disclose the present invention, a plastic clip core used on rotary brush typically found in carwashes. The embodiment and description are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. The present invention is novel with respect to the prior art, and can be distinguished from the prior art.

In general, the present invention, a plastic clip core and rotary brush, provides for rapid maintenance of the LWEs on rotary brushes typically found in car washes. The plastic clip core and rotary brush is comprised of a rotational hub, a plastic clip core, a plurality of plastic clips, and a plurality of LWE. The rotational hub is cylindrical with a compound interior surface and a compound exterior surface, meaning that the cross-section of the rotational hub is an annulus with a compound interior and exterior surface. The exterior of the rotational hub mates with the interior surface of the plastic clip core. The exterior of the rotational hub has an alternating plurality of semi-cylindrical mating surfaces and indentations.

The plastic clip core is generally cylindrical in nature, with a compound interior and exterior surface. The interior surface of the plastic clip core mates with the exterior surface of the rotational hub. The plastic clip core has a compound cylindrical internal surface comprised from an alternating plurality of semi-cylindrical inner surfaces and protrusions. The rotational hub has a plurality of mating surfaces and indentations on its exterior cylindrical surface. The plastic clip core fits over the rotational hub. The plurality of plastic clip core semi-cylindrical inner surfaces align and mate with the plurality of rotational hub mating surfaces. The plurality of plastic clip core protrusions mate with the plurality of rotational hub indentations. With the plastic clip core properly mated to the rotational hub, a rotational no-slip condition will exist between the plastic clip core and rotational hub.

The plastic clip core has a compound annular top surface and a compound annular bottom surface. The exterior surface of the plastic clip core is created from a plurality of concave surfaces alternating with an equal plurality of semi-cylindrical void cavities. Each semi-cylindrical void cavity extends from the compound annular bottom surface to the compound annular top surface. Each semi-cylindrical void cavity terminates in a left filleted surface and a right filleted in the adjoining concave surfaces. The interior of a semi-cylindrical void cavity is made up of a semi-cylindrical surface which extends to the compound annular top surface. A portion of the semi-cylindrical surface is interrupted by a three-dimensional saddle surface that connects to a cylindrical void cavity. In other words, each semi-cylindrical void cavity of the plastic clip core is separated from an adjoining cylindrical void cavity by a three-dimensional saddle surface. Each adjoining cylindrical void cavity can extend from the compound annular bottom surface to the compound annular top surface, although it is not required for this invention. Allowing the adjoining cylindrical void cavity to extend to the compound annular bottom surface prevents water from accumulating in the adjoining cylindrical void cavity during maintenance. The compound annular top surface has rounded terminations created by the right filleted surfaces and the left filleted surfaces, respectively.

The plastic clip has two cylindrical members joined by a transverse member. The two cylindrical members are parallel.

In a first embodiment, the two cylindrical members are equal in height and diameter. Both cylindrical members have a rounded bottom. The plastic clip has a filleted edge connecting the cylindrical members to a transverse member with a flat top. The transverse member is orthogonal to the two cylindrical members.

In a second embodiment, the two cylindrical members have different heights and diameters. When comparing the first member to the second member, the first member has a greater height but a smaller diameter. The first member has a flange on its bottom. The flange secures the plastic clip to the cylindrical mount of the LWE. The flange also snaps into the semi-cylindrical void cavity of the plastic clip core, to secure the LWE and plastic clip in place during use. The second member has a rounded bottom. The first and second members are connected to a transverse member with a flat top. The transverse member is orthogonal to the two cylindrical members.

The two cylindrical members of the plastic clip fit into a semi-cylindrical void cavity and a cylindrical void cavity in the plastic clip core. The transverse member rests on the three-dimensional saddle surface.

The LWE is constructed from two oppositionally disposed planar members that are connected together at a cylindrical mount. The two oppositionally disposed planar members are bonded together, leaving a bond seam. Each planar member has an upper edge, a lower edge, a free edge, and a cylindrical mount. The cylindrical mount has an inner cylindrical surface and a cut-out. The LWE so fabricated can be one continuous piece of material.

The cylindrical mount has an external semi-cylindrical surface that meets the planar members of the LWE at a seam. To assemble the plastic clip core, the first cylindrical member of the plastic clip fits in the inner cylindrical surface of the cylindrical mount of the LWE and a semi-cylindrical void cavity. The transverse member of the plastic clip fits in the cut-out of the cylindrical mount of the LWE. The cylindrical mount with the first cylindrical member of the plastic clip inserted fits in the semi-cylindrical void cavity. The diameter of the semi-cylindrical void cavity is such that it allows for the insertion of the LWE cylindrical mount with the first member of the plastic clip inserted into the LWE cylindrical mount. The second cylindrical member of the plastic clip fits into the adjoining cylindrical void cavity. The diameter of the adjoining cylindrical void is such that it allows for the insertion of the second member of the plastic clip to be inserted. The transverse member rests on the saddle surface. In similar fashion, the remainder of the plurality of LWE are attached to the plastic clip core with an equal plurality of plastic clips.

A plastic clip core that is fully populated with a plurality of LWE retained with plastic clips is called a plastic clip core assembly. A plastic clip core assembly is mated with the rotational hub. This constitutes a rotary brush using a plastic clip core. The rotary brush so constructed can be used with a rotary brush assembly comprised of a rotary brush mount, a drive mechanism, a suspension, and a rotary brush assembly mount, inter alia.

The LWE is fabricated from a flexible and durable hygroscopic material, such as felt, foamed polymers, polyethylene, foamed EVA, or fabric. Typically, the LWE is made by folding a length of material in half and binding them together. Alternately, the LWE can be constructed from two planar members joined together at the cylindrical mount. The LWE can be bound together using adhesive or stitching. A seam defines the cylindrical mount. The cylindrical mount has a small cut-out that facilitates the placement of the plastic clip by accommodating the transverse member.

The plastic clip core is fabricated from a durable metal suitable to the application, such as steel, aluminum or a metal alloy. The plastic clip core is most easily fabricated using a computer, numerically controlled machine ("CNC"). The left filleted surface and the right filleted surface serve a critical purpose in preventing the fatigue of the LWE at its interface with the plastic clip core.

BRIEF DESCRIPTION OF THE DRAWINGS

The present invention is illustrated with 10 drawings on 10 sheets.

DETAILED DESCRIPTION OF THE DRAWINGS

The following descriptions are not meant to limit the invention, but rather to add to the summary of invention, and illustrate the present invention, a framed cover with one-way hinges. The present invention is illustrated with a variety of drawings showing the primary embodiment of the present invention, with examples presented of the various form-factors that the present invention can take.

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

Figure 2:
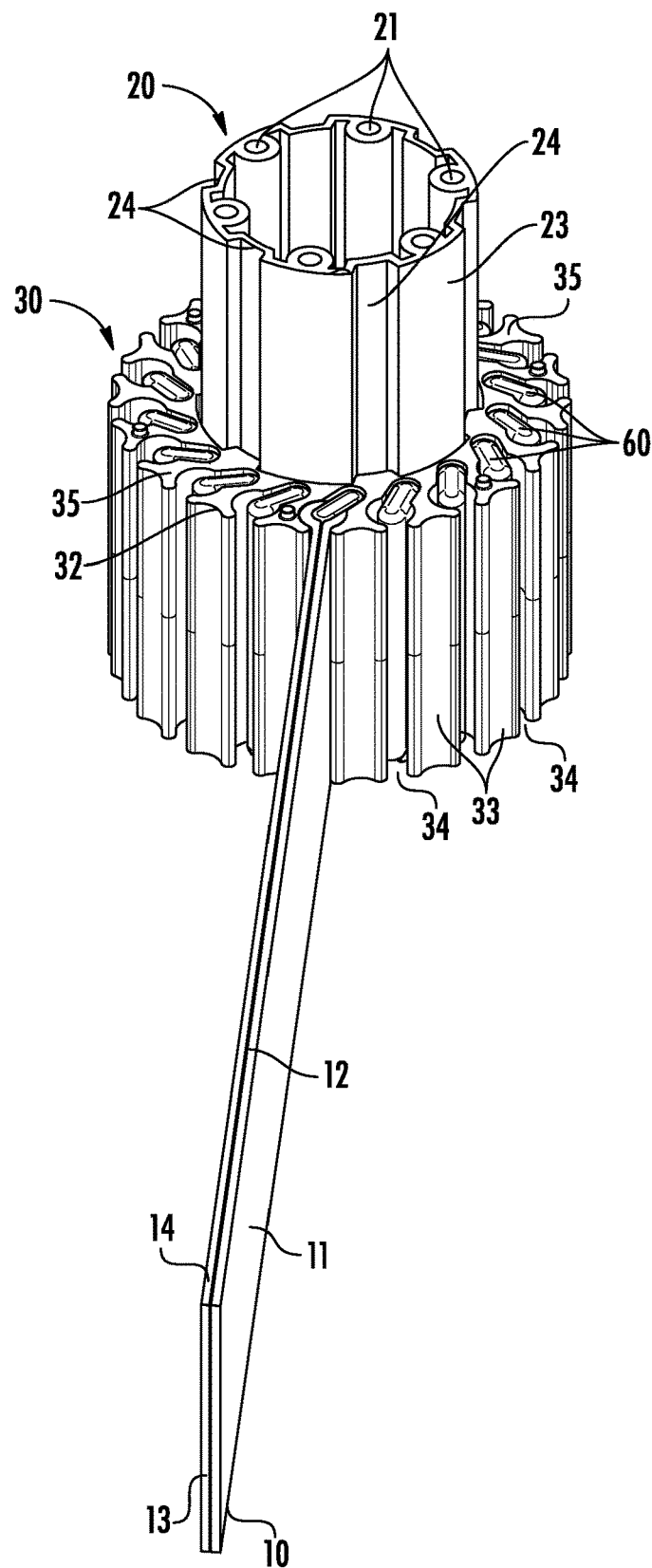
FIG. 2 is a perspective view of a partially disassembled rotary brush using the present invention, a plastic clip core.
Figure 5:
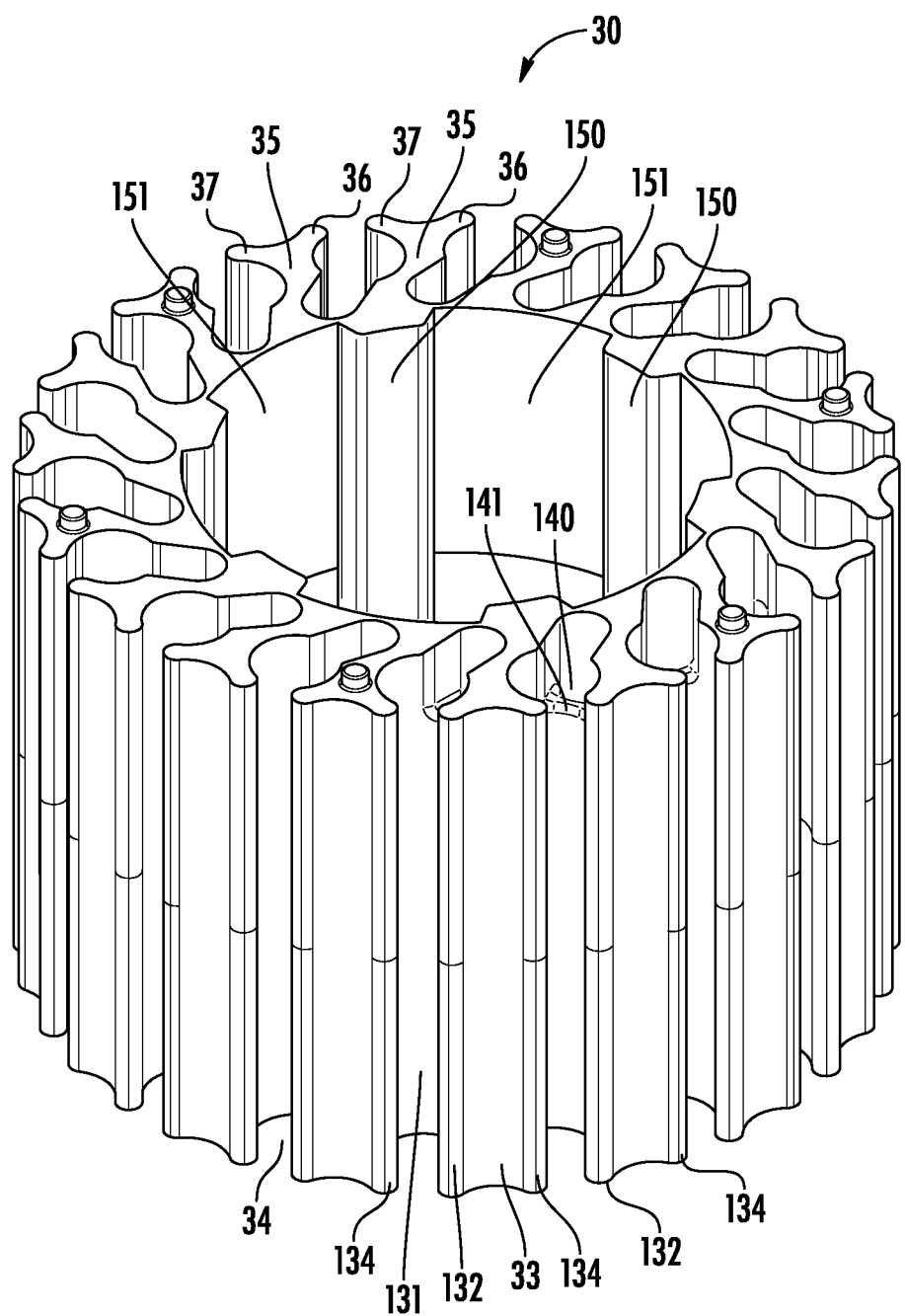
FIG. 5 is an isolation of the plastic clip core.
Figure 7:
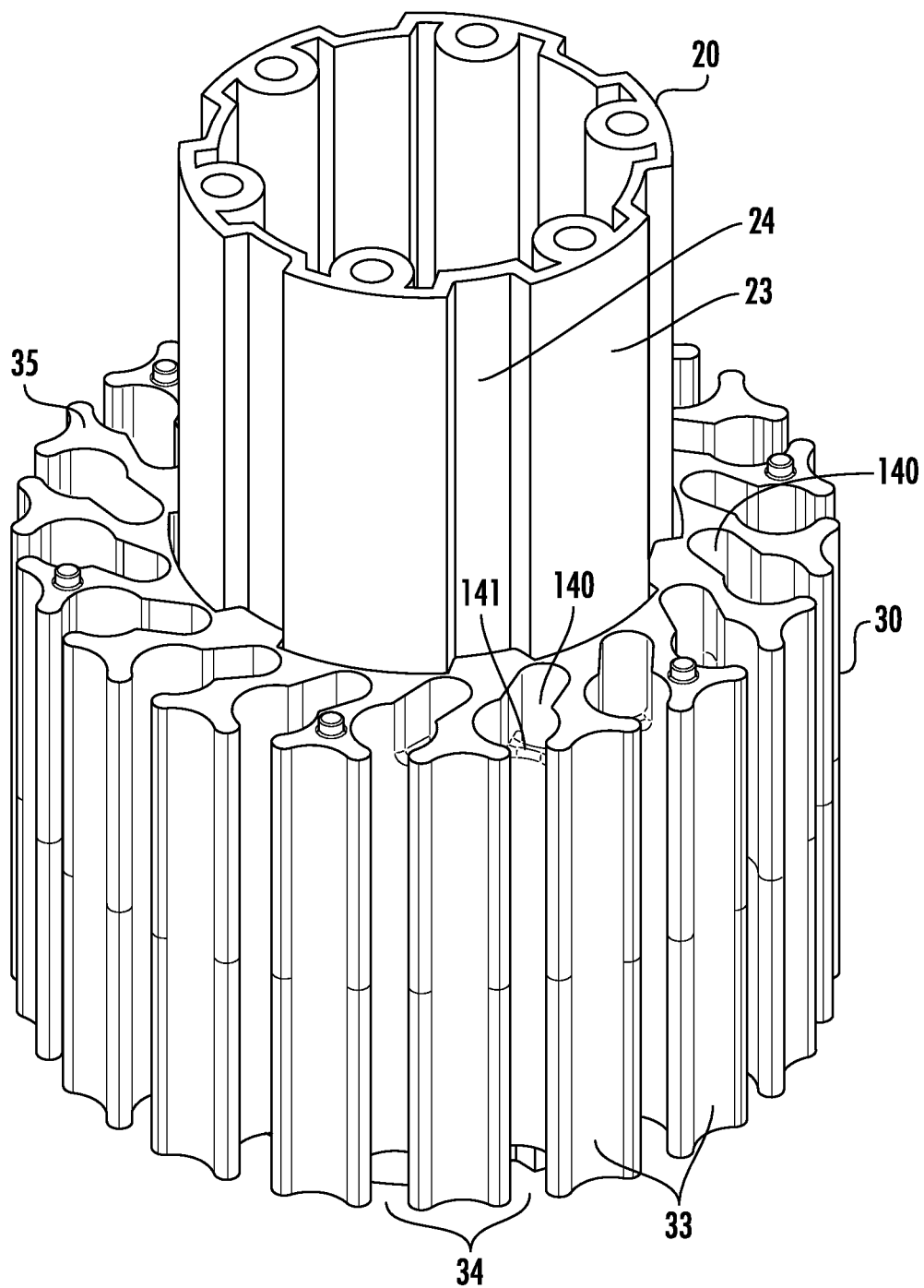
FIG. 7 is an isolation of plastic clip core mated with the rotational hub of a rotary brush assembly.

Referring to the FIGS. 2, 5, and 7, the present invention 30 is a plastic clip core 30 for use in a rotary brush 1 in a carwash. The rotational hub 20 has a plurality of mating cylinders 21, and an outer cylindrical surface 23, 24 comprised of an alternating plurality of mating surfaces 23 and indentations 24.

The plastic clip core 30 mates with a rotational hub 20. The plastic clip core 30 has a compound cylindrical internal surface 150, 151 comprised from plurality of semi-cylindrical inner surfaces 151 and protrusions 150. The rotational hub 20 has a plurality of mating surfaces 23 and indentations 24 on its outer cylindrical surface 23, 24. The plastic clip core 30 fits over the rotational hub 20. The plurality of plastic clip core 30 semi-cylindrical inner surfaces 151 align and mate with the plurality of rotational hub 20 mating surfaces 23. The plurality of plastic clip core 30 protrusions 150 mate with the plurality of rotational hub 20 indentations 24. With the plastic clip core 30 properly mated to the rotational hub 20, a rotational no-slip condition will exist between the plastic clip core 30 and rotational hub 20.

The plastic clip core 30 has a compound annular top surface 35. The plastic clip core 30 has a compound annular bottom surface, that is usually, although not necessarily, identical to the compound annular top surface 35. The exterior surface of the plastic clip core 30 is created from a plurality of concave surfaces 33 alternating with a plurality of semi-cylindrical void cavities 34. Each semi-cylindrical void cavity 34 terminates in a left filleted surface 132 and a right filleted 134 in the adjoining concave surfaces 33. The interior of a semi-cylindrical void cavity 34 is made up of a semi-cylindrical surface 131 which extends to the compound annular top surface 135. A portion of the semi-cylindrical surface 131 is interrupted by a three-dimensional saddle surface 141 that connects to a cylindrical void cavity 140. In other words, each semi-cylindrical void cavity 34 of the plastic clip core 30 is separated from an adjoining cylindrical void cavity 140 by a three-dimensional saddle surface 141. The compound annular top surface 35 has rounded terminations 36, 37 created by the right filleted surfaces 134 and the left filleted surfaces 132, respectively.

Figure 4:
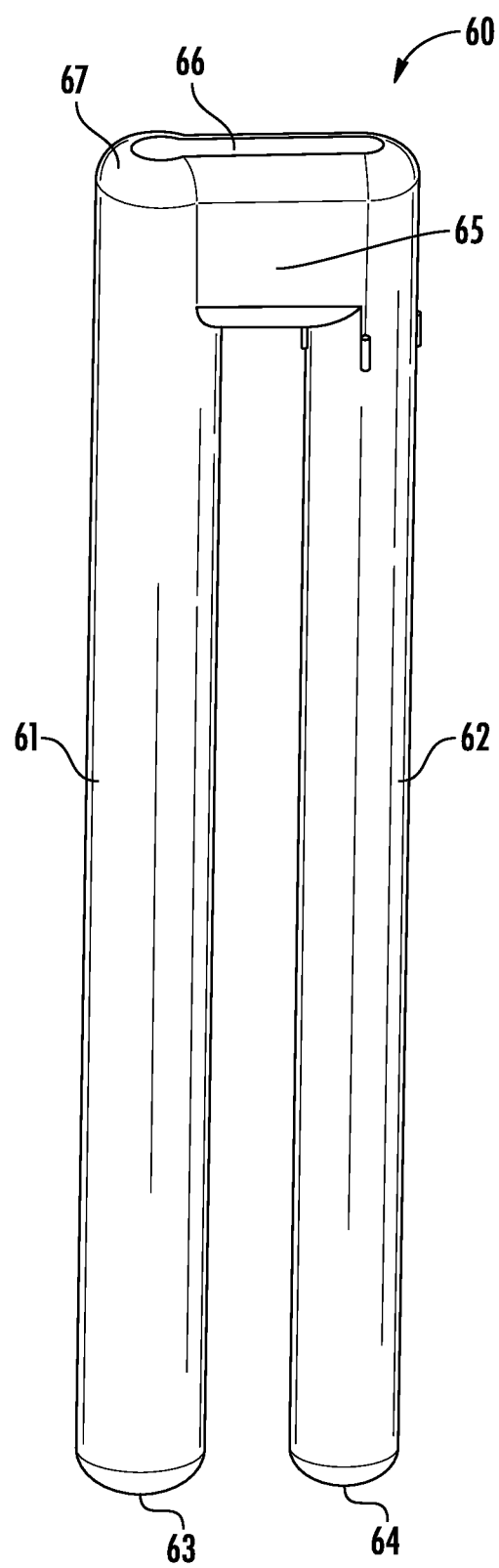
FIG. 4 is an isolation view of a plastic clip.

FIG. 4 shows a first embodiment of the plastic clip 60. The plastic clip 60 has two parallel cylindrical members 61, 62 joined by a transverse member 65. Each cylindrical member 61, 62 has a rounded bottom 63, 64. The plastic clip has a filleted edge 67 connecting the cylindrical members 61, 62 and transverse member 65 to a flat top 66. The first cylindrical member 61 and the second cylindrical member 62 are equal in height.

The first and second cylindrical members 61, 62 of the plastic clip 60 fit into a semi-cylindrical void cavity 34 and a cylindrical void cavity 140 in the plastic clip core 30, respectively. The transverse member 65 rests on the three-dimensional saddle surface 141.

Figure 1:
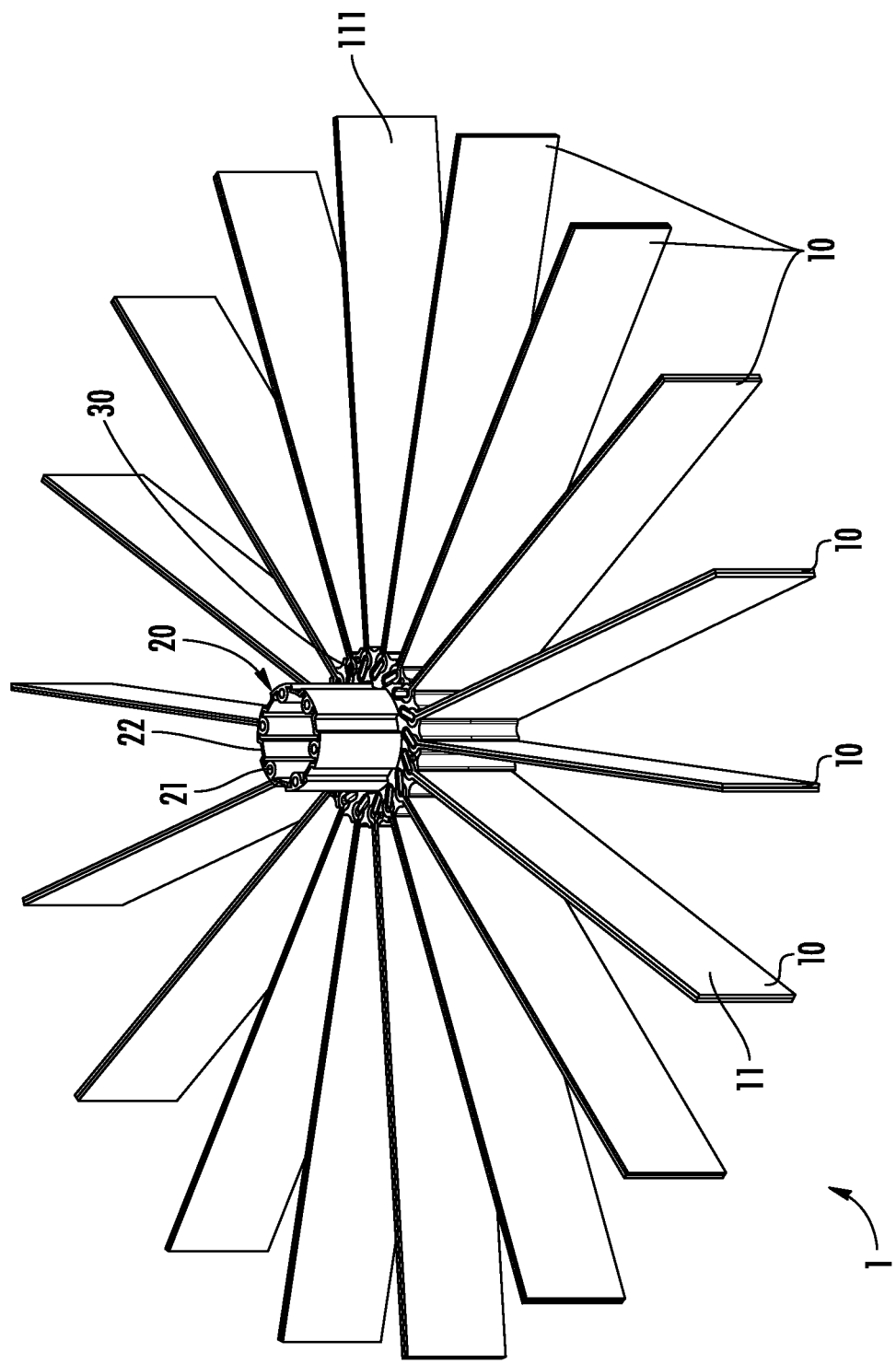
FIG. 1 is a perspective view of a rotary brush using the present invention, a plastic clip core.

FIG. 1 shows that two oppositionally disposed planar members 11, 111 form the LWE 10. Referring to both FIGS. 1 and 6, the two oppositionally disposed planar members 11, 111 are bonded together, leaving a bond seam 12. Each planar member 11, 111 has an upper edge 14, a lower edge 15, a free edge 13, and a cylindrical mount 16. The cylindrical mount 16 has an inner cylindrical surface 19 and a cut-out 119.

Figure 3:
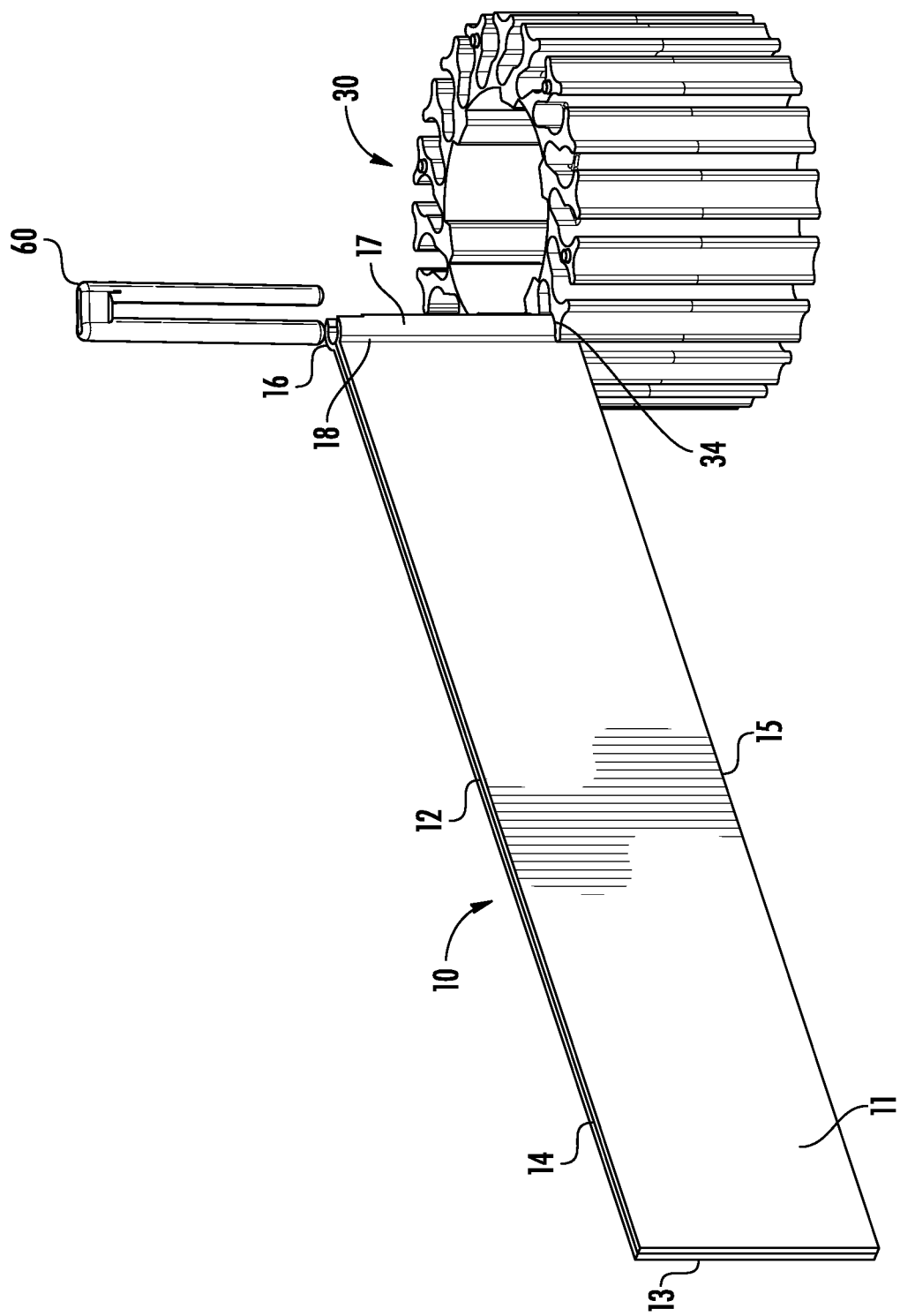
FIG. 3 is an exploded perspective view of a partially disassembled rotary brush using the present invention, a plastic clip core.
Figure 6:
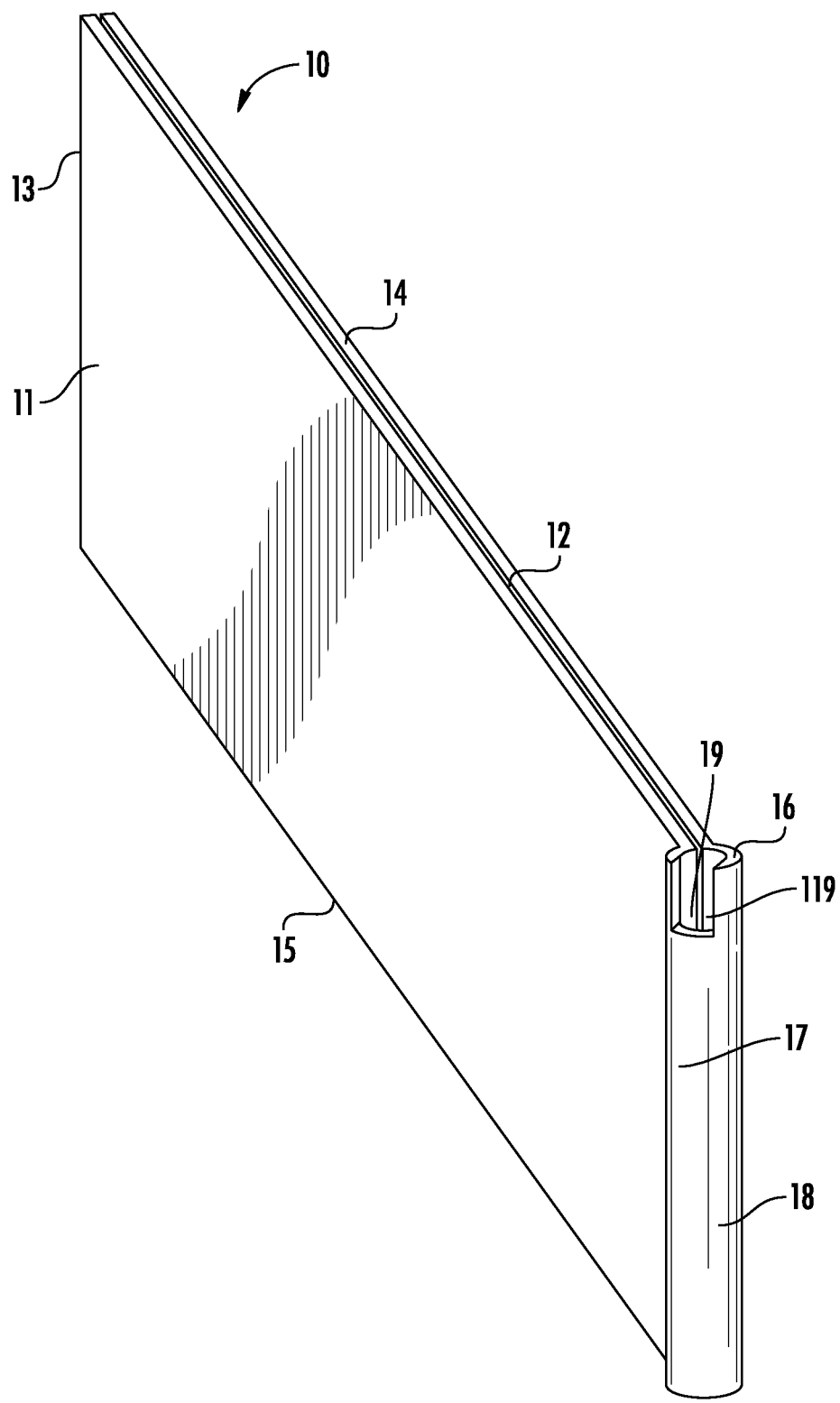
FIG. 6 is an isolation of a LWE.

FIG. 6 shows the construction of a LWE in isolation. FIG. 3 is an exploded view showing the insertion of one of the plastic clips 60, and one of the LWE 10, into the plastic clip core 30. The cylindrical mount 16 has an external semi-cylindrical surface 18 that meets the planar member 11 at a seam 17. The first cylindrical member 61 fits in the inner cylindrical surface 19 of the cylindrical mount 16 of the LWE 10. The transverse member 65 fits in the cut-out 119 of the cylindrical mount 16. The cylindrical mount 16, with the first cylindrical member 61 of the plastic clip 60 inserted, fits in the semi-cylindrical void cavity 34. The second cylindrical member 62 of the plastic clip 60 fits into the adjoining cylindrical void cavity 140. The transverse member 65 rests on the saddle surface 141. In similar fashion, the remainder of the plurality of LWE 10 are attached to the plastic clip core 30 with an equal plurality of plastic clips 60. Referring to FIG. 1, a plastic clip core 30 that is fully populated with a plurality of LWE 10 is referred to as a plastic clip core 30 assembly. A plastic clip core 30 assembly that is fully populated with a plurality of LWE 10 using plastic clips 60, is mated with the rotational hub 20. This constitutes a rotary brush 1 using a plastic clip core 30. The rotary brush 1 so constructed can be used with a rotary brush assembly comprised of a rotary brush mount, a drive mechanism, a suspension, and a rotary brush assembly mount, inter alia.

Figure 8:
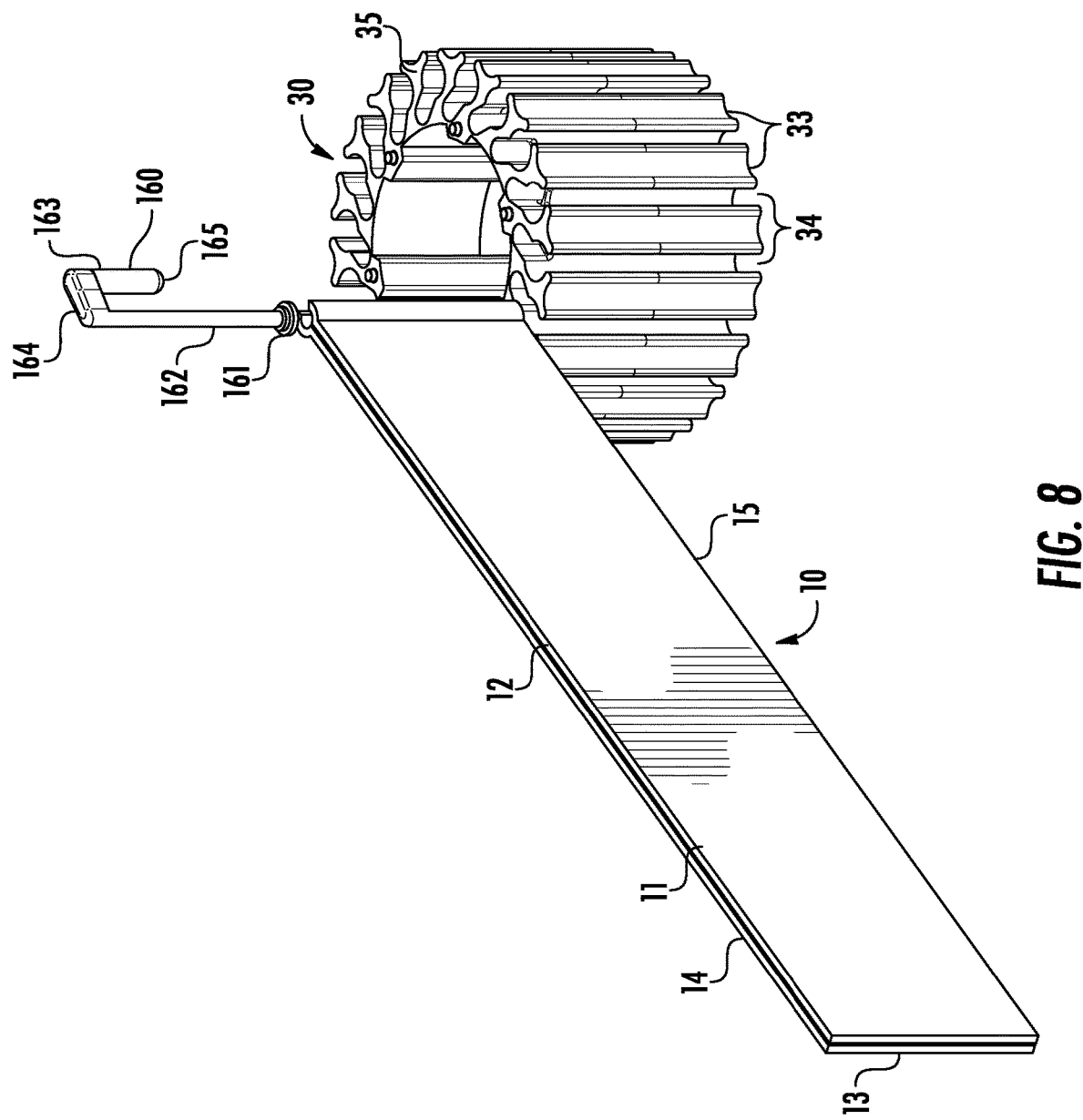
FIG. 8 is perspective view of a partially assembled rotary brush using an alternative embodiment of the plastic clip and plastic clip core.
Figure 9:
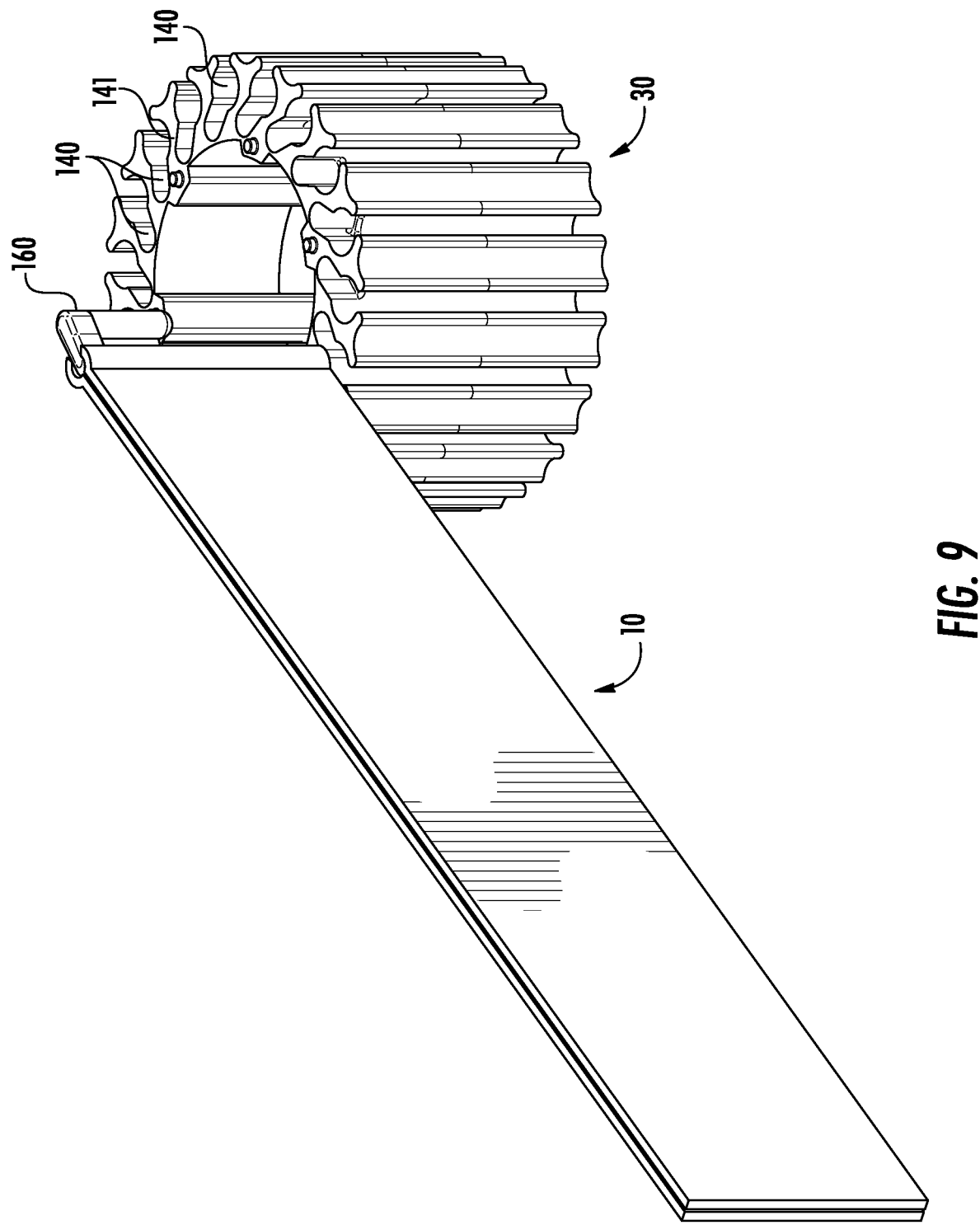
FIG. 9 is a perspective view of a partially assembled rotary brush using an alternative embodiment of the plastic clip and plastic clip core, wherein the plastic clip is inserted into the LWE.
Figure 10:
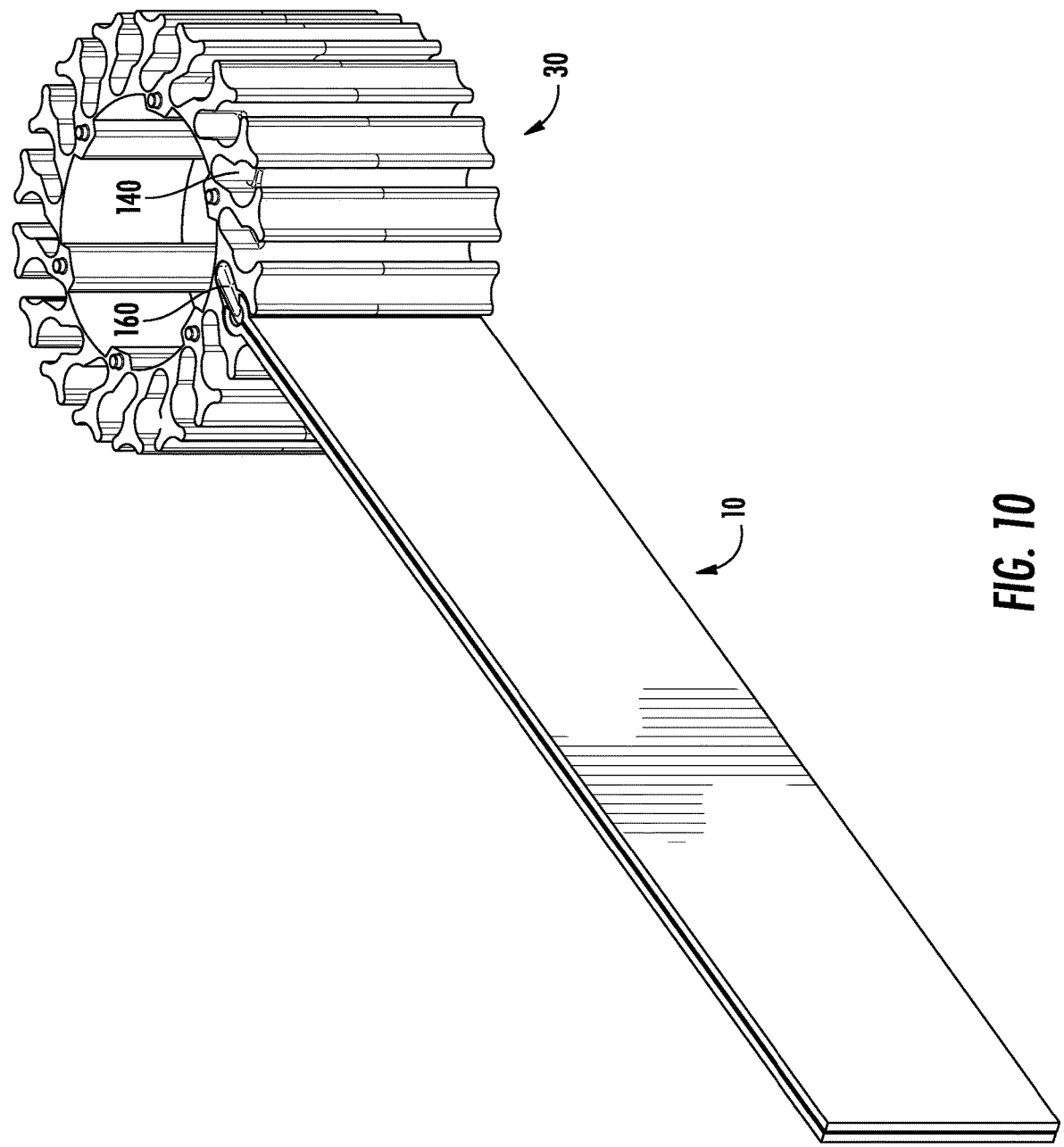
FIG. 10 is a perspective view of a partially assembled rotary brush using an alternative embodiment of the plastic clip and plastic clip core, wherein the plastic clip and LWE have been inserted into the plastic clip core.

FIGS. 8-10 are a progression showing the insertion of an alternative embodiment of the plastic clips 160, and one of the LWE 10, into the plastic clip core 30. This plastic clip 160 has two parallel cylindrical members 162, 163 of different height and width, joined by a transverse member 164. When comparing the first member 162 to the second member 163, the first member 162 has a greater height but a smaller diameter. In other words, the first member 162 is taller than the second member 163; and the first member 162 has a smaller diameter than the second member 163. The first member 162 has a flange 161 on its bottom. The smaller diameter of the first member 162 allows the cylindrical mount 16 of the LWE 10 to move about the first member 162 more easily than it would with a thicker diameter. The flange 161 acts as a stop on the cylindrical mount 16 of the LWE 10. The flange 161 also snaps into the semi-cylindrical void cavity 34, to assure that the plastic clip 160 and LWE 10 remain in place during use. This prevents the plastic clip 160 and LWE 10 from being dislodged when struck or tugged. The second member 163 has a rounded bottom 165. The first 162 and second 163 members are connected to a transverse member 164 with a flat top 164. The transverse member 164 is orthogonal to the two cylindrical members 162, 163.

The plastic clip core 30 for the alternative embodiment of the plastic clip 160 remains unaltered. The plastic clip core 30 still has a plurality of concave surfaces 33 alternating with a plurality of semi-cylindrical void cavities 34, a plurality of cylindrical void cavities 140 adjoining the semi-cylindrical void cavities 34, a plurality of three-dimensional saddle surfaces 141 separating the cylindrical void cavities 140 from the semi-cylindrical void cavities 34, and a compound annular top surface 35.

Likewise, the LWE 10 is unaltered. FIG. 8 shows the LWE 10 and its planar member 11, a bond seam 12, an upper edge 14, a lower edge 15, and a free edge 13.

The first and second cylindrical members 162, 163 of the plastic clip 160 fit into a semi-cylindrical void cavity 34 and a cylindrical void cavity 140 in the plastic clip core 30, respectively. The transverse member 164 rests on the three-dimensional saddle surface 141.

The LWE 10 is fabricated from a flexible and durable hygroscopic material, such as felt, foamed polymers, polyethylene, foamed EVA, or fabric. The LWE 10 is made by folding a length of material in half and binding them together. The LWE can be bound together using adhesive or stitching. Near the mid-point, a seam 18 defines the cylindrical mount 16. The cylindrical mount 16 has a small cut-out 119 that facilitates the placement of the plastic clip 60 by accommodating the transverse member 65.

The plastic clip core 30 is fabricated from a durable metal suitable to the application, such as steel, aluminum or a metal alloy. The plastic clip core 30 is most easily fabricated using a computer, numerically controlled machine ("CNC"). The left filleted surface 132 and the right filleted surface 134 serve a critical purpose in preventing the fatigue of the LWE 10 at its interface with the plastic clip core 30.

We claim:

1. A plastic clip core comprising
   a compound cylindrical external surface,
   a compound cylindrical internal surface,
   a compound annular top surface, a compound annular bottom surface,
wherein the compound cylindrical external surface has a plurality of semi-cylindrical void cavities extending from the compound annular bottom surface to the compound annular top surface; and
wherein each semi-cylindrical void cavity has an adjoining cylindrical void cavity.

2. The plastic clip core of claim 1, wherein a portion of each semi-cylindrical void cavity is interrupted by a three-dimensional saddle surface, which connects the semi-cylindrical void cavity to its adjoining cylindrical void cavity.

3. The plastic clip core of claim 2, wherein the compound cylindrical external surface is comprised from an equal plurality of alternating concave surfaces and semi-cylindrical void cavities.

4. The plastic clip core of claim 3, wherein the compound cylindrical external surface is further comprised of a plurality of filleted surfaces separating the equal plurality of alternating concave surfaces and semi-cylindrical void cavities.

5. The plastic clip core of claim 4, wherein the compound cylindrical internal surface is comprised from an alternating plurality of semi-cylindrical inner surfaces and protrusions.

6. The plastic clip core of claim 5, wherein the cylindrical void cavities extend from the compound annular bottom surface to the compound annular top surface.

* * * * *